United States Patent [19]

Baker

[11] Patent Number: 5,519,440
[45] Date of Patent: May 21, 1996

[54] COMPOSITE SIGNAL-LIMIT INDICATOR FOR A COMPONENT MONITOR

[75] Inventor: Daniel G. Baker, Aloha, Oreg.

[73] Assignee: Tektronix, Inc., Wilsonville, Oreg.

[21] Appl. No.: 443,804

[22] Filed: May 18, 1995

Related U.S. Application Data

[63] Continuation of Ser. No. 182,270, Jan. 18, 1994, abandoned.

[51] Int. Cl.⁶ .................................................. H04N 17/02
[52] U.S. Cl. ........................ 348/186; 348/185; 348/180; 358/518
[58] Field of Search ...................... 348/180, 184, 348/186, 185, 659, 660, 649, 708, 651, 645, 646, 453, 703, 722; 358/518, 520; 345/135, 134, 153–155; H04N 17/02, 9/64, 9/68, 9/67

[56] References Cited

U.S. PATENT DOCUMENTS

| | | | |
|---|---|---|---|
| 4,364,080 | 12/1982 | Vidovic | 348/185 |
| 4,635,094 | 1/1987 | Thong | 348/184 |
| 4,707,727 | 11/1987 | Penney | 348/184 |
| 4,740,841 | 4/1988 | Slavin | 348/186 |
| 5,122,863 | 6/1992 | Zortea | 348/180 |
| 5,307,087 | 4/1994 | Baker | 345/150 |
| 5,311,295 | 5/1994 | Tallman et al. | 348/180 |
| 5,373,327 | 12/1994 | McGee et al. | 348/180 |

FOREIGN PATENT DOCUMENTS 63-119397  5/1988  Japan ................ H04N 17/02

OTHER PUBLICATIONS

"HP Quality Advisor QA 100 (including the HP Remote Front Panel)" Service Guide, Hewlett-Packard Company 1994, HP Part No. E2550-90010.

Floppy Disk containing a program entitled "HP Color Tutor".

"HP Quality Advisor QA 100, HP EDH Inserter EDH 10, Eliminate Illegal Colors and Sparkles from 4:2:2 Digital Video", Hewlett Packard.

*Primary Examiner*—Safet Metjahic
*Attorney, Agent, or Firm*—Francis I. Gray

[57] ABSTRACT

A composite signal-limit indicator for a component monitor converts an input video signal, such a digital 422 signal or a GBR signal, into composite Y and Mag¦C¦ component signals The composite Y and Mag¦C¦ component signals are presented on an X-Y display together with graticules that represent the locus of 100 IRE values and of –20 IRE values. Points of the composite Y and Mag¦C¦ component signals that fall outside the arrowhead formed by the graticules indicate composite signal level violations for the input video signal. The composite Y and Mag¦C¦ component signals are combined and compared with the limits represented by the graticules. The results of the comparison are latched for further processing to automatically provide the composite signal-limit indicator. The results of the comparison may also be used to generate a bright-up display on an image monitor that flickers to indicate the locations within the image represented by the input video signal where the composite signal level violations occur. Finally the arrowhead display may be combined with a conventional vectorscope display and a diamond display to present an apparent simultaneous combination display on the component monitor.

6 Claims, 2 Drawing Sheets

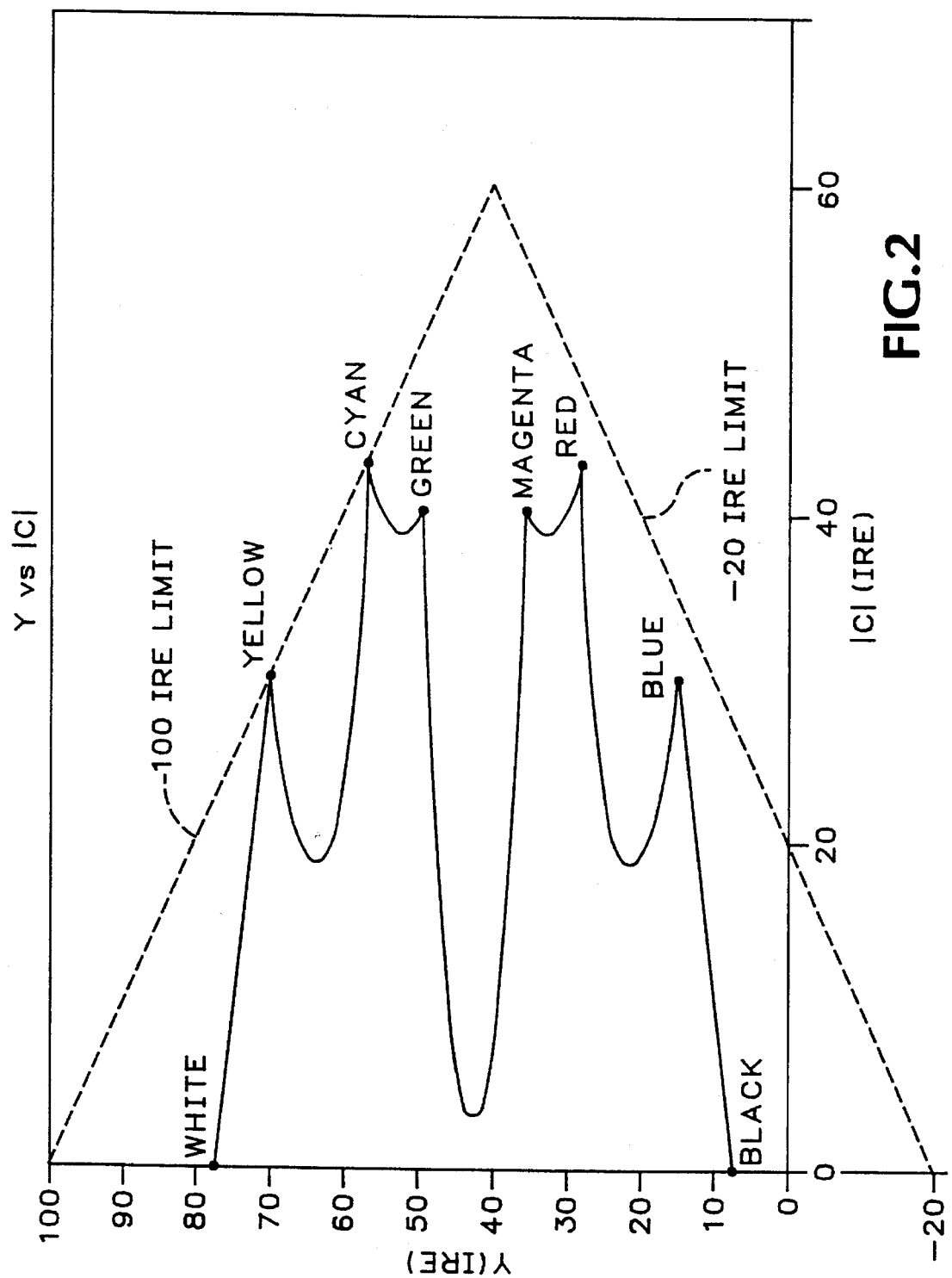

COMPOSITE SIGNAL-LIMIT INDICATOR FOR A COMPONENT MONITOR

This is a continuation of application Ser. No. 08/182,270 filed Jan. 18, 1994, and now abandoned.

BACKGROUND OF THE INVENTION

The present invention relates to component television video monitors, and more particularly to a composite signal-limit indicator for such a component monitor to verify that the processing or signal creation in other component video formats does not violated signal dynamic range limitations when encoded into a composite signal.

Existing component television video signal monitors, such as the WFM-300A manufactured by Tektronix, Inc. of Wilsonville, Oreg., United States of America, have the ability to detect color gamut violations, as indicated by U.S. Pat. No. 4,707,727 issued Nov. 17, 1987 to Bruce J. Penney entitled "Apparatus for Providing an Indication That a Color Represented by a Y, R-Y, B-Y Color Television Signal is Validly Reproducible on an RGB Color Display Device". The encoded color components Y, R-Y, B-Y are transformed into the primary color components RGB and input to two sets of comparators, one set having as a reference level the maximum value (700 mV) and the other set having as a reference level the minimum value (0.0 V). The outputs of the comparators are input to an OR gate so that, if any one of the primary color components are above or below the maximum or minimum values, a gamut error signal is produced. The gamut error signal is used to drive an LED on a front panel as a gamut error indicator.

The 500 Series Waveform Monitors/Vectorscopes manufactured by Magni Systems, Inc. of Beaverton, Oreg. also provide a gamut indication. A separate output for each comparator is provided for display so that the primary color component and direction (plus or minus) of the gamut error are displayed.

Signals in various component formats need to be converted to RGB to verify that the processing or signal creation in these formats has not violated the signal dynamic range limitations in the RGB format, referred to as component gamut violation. Since the signal very often has to be converted to composite NTSC or PAL for distribution, there is the additional problem of composite signal level violations. When the component signals are encoded into a composite signal by passing them through a properly adjusted composite encoder, the output magnitude may exceed the allowed composite signal levels even though the component input is within the RGB formal limits. The traditional way of resolving this is to use an additional signal monitor at the output of the composite encoder to monitor the composite signal levels. This may be acceptable unless color gamut adjustments are being made on a component system and it is to be encoded into a composite format elsewhere. Also the value of this technique is only as good as the encoder accuracy. However there is a growing need to monitor component formats such as RGB and Y,Pb,Pr either in digital or analog form and verify that they are within the composite signal level limits.

What is desired is the ability to detect or display the composite signal level violations on a component monitor.

SUMMARY OF THE INVENTION

Accordingly the present invention provides a composite signal-limit indicator for component monitors by converting an input video signal to composite Y and Mag|C| component signals. The composite Y and Mag|C| component signals are displayed on an X-Y display together with positive and negative graticules representing respective limit values to present an arrowhead display, with values of the composite Y and Mag|C| component signals falling outside the graticules being indications of composite signal level violations. The composite Y and Mag|C| component signals also are combined additively and subtractively to produce comparison signals for comparison with the respective limit values. The outputs of the comparison are latched so that they may be processed by a microprocessor to present the composite signal-limit indicator on the component monitor. A bright-up signal is generated by combining a bright-up value with the input video signal on an oscillating basis to cause locations in the displayed image on a component picture monitor with composite signal level violations to flicker. Finally the arrowhead display is combined with a conventional vector display and a diamond display to present an apparent simultaneous combination display from which the input video signal may be characterized.

The objects, advantages and novel features of the present invention are apparent from the following detailed description when read in conjunction with the appended claims and attached drawing.

BRIEF DESCRIPTION OF THE DRAWING

FIG. 2 is a graphic display view of an arrowhead display according to the present invention.

DESCRIPTION OF THE PREFERRED EMBODIMENT

Figure 1:
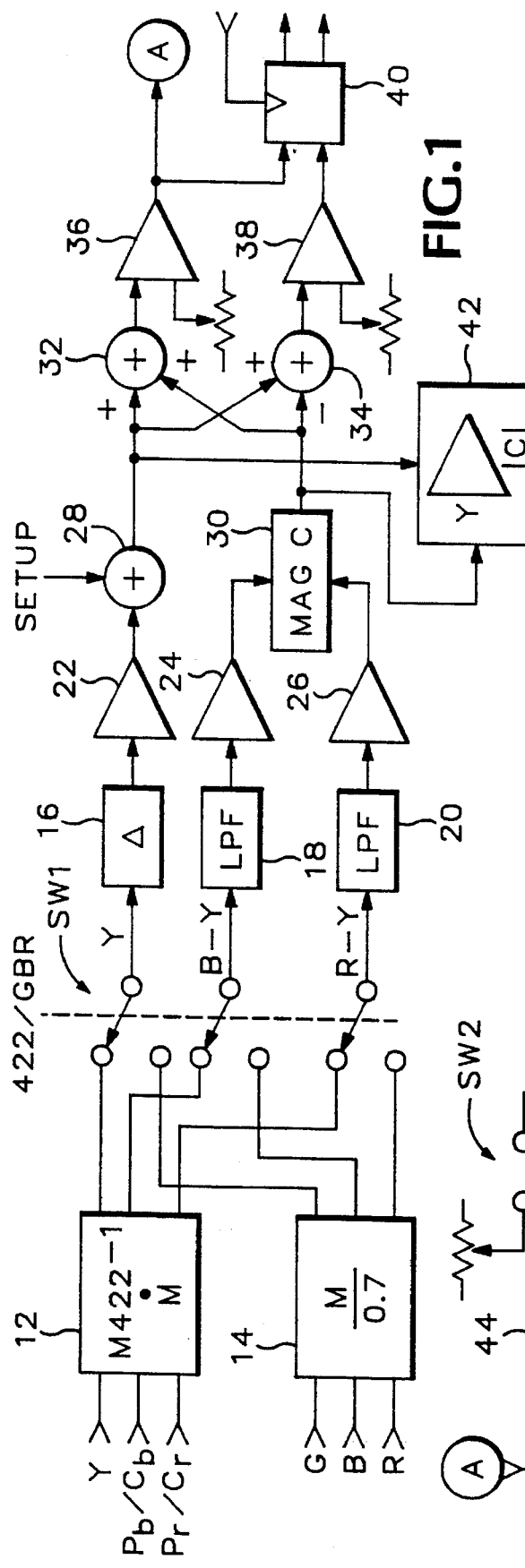
FIG. 1 is a block diagram view of a composite signal level violation detector according to the present invention.
Figure 4:
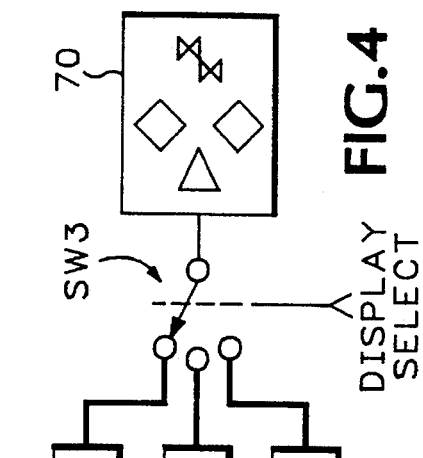
FIG. 4 is a block diagram view of a combination display circuit according to the present invention.

Referring now to FIG. 1 a digital 4:2:2 signal (Y,Pb,Pr or Y,Cb,Cr) is input to a first transcoder 12 for conversion to component Y,B-Y,R-Y values. From CCIR Recommendation 601-1:

$$\begin{vmatrix} Y \\ Cb \\ Cr \end{vmatrix} = M422 * \begin{vmatrix} G \\ B \\ R \end{vmatrix} \quad M422 = \begin{vmatrix} .587 & .114 & .299 \\ -.331 & .500 & -.169 \\ -.419 & -.081 & .500 \end{vmatrix}$$

Therefore to convert 422 signals to GBR $$\begin{vmatrix} G \\ B \\ R \end{vmatrix} = M422^{-1} * \begin{vmatrix} Y \\ Cb \\ Cr \end{vmatrix}$$

Likewise a GBR signal is input to a second transcoder 14 for conversion to component Y,B-Y,R-Y values. For NTSC:

$$\begin{vmatrix} Y \\ B-Y \\ R-Y \end{vmatrix} = M * \begin{vmatrix} G \\ B \\ R \end{vmatrix} \quad M = \begin{vmatrix} .587 & .114 & .299 \\ -.587 & .886 & -.299 \\ -.587 & -.114 & .701 \end{vmatrix}$$

From the NTSC standard composite coefficients are Kb=0.492111 and Kr=0.877283. Thus to convert the 422 signal the transform function is $M422^{-1} * M$, where $$M422^{-1} * M = \begin{vmatrix} 1 & 0 & 0 \\ 0 & 1.772 & 0 \\ 0 & 0 & 1.402 \end{vmatrix}$$

and to convert the GBR signal the transform function is M/0.7. The NTSC matrix, M, assumes unity (one volt) RGB inputs, and it is scaled for the 0.0–0.7 volt RGB signal range.

The composite Y values from the transcoders 12, 14 are input to a switch SW1, and the resulting output is the selected one of the inputs, 422 or GBR, converted to Y, B-Y and R-Y. The luminance component Y is input to a delay device 16 to compensate for the processing time of the chrominance components B-Y and R-Y. The B-Y and R-Y components are input to respective lowpass filters 18, 20. The components Y,B-Y,R-Y are then normalized by respective amplifiers 22, 24, 26, each having an gain factor of 0.925 for a 7.5% setup level. The Y component is input to a summer 28 where a setup value is added (7.5 IRE for NTSC) to obtain a composite luminance component signal Y'. Likewise the chrominance components are input to an absolute value chrominance (Mag|C|) circuit 30. The Mag|C| function is defined by:

$$Mag|C|(B-Y,R-Y) = |((B-Y)*Kb)^2 + ((R-Y)*Kr)^2)^{1/2}|$$

To detect composite signal limit errors the composite luminance component signal Y' is added to the magnitude of the composite chrominance signal |C| from the chrominance circuit 30 in positive summer 32, and |C| is subtracted from Y' in a subtractor 34. The output of the positive summer 32 is input to a positive comparator 36 which has as its other input a 100 IRE value, or a selectable positive limit value. The output of the subtractor 34 is input to a negative comparator 38 which has as its other input a –20 IRE value, or a selectable negative limit value. The outputs from the comparators 36, 38 may be captured by a latch 40 controlled by a microprocessor (not shown). The microprocessor may use the latch outputs to generate a front panel indicator of composite signal level violations.

The Y' and |C| signals also may be displayed as an arrowhead display on a display device 42. The arrowhead display is shown in FIG. 2 as an X-Y plot of Y' vs |C|. A positive limit graticule is displayed, and a negative limit graticule also is displayed. These two lines converge to a point, from which the term "arrowhead" is derived. The signal shown in FIG. 2 is a 75% amplitude color bar signal. The locus for an 100 IRE composite limit becomes the positive limit graticule. This graticule intersects the 75% amplitude Cyan and Yellow bars, which criterion was used to define the scaling coefficients for R-Y, B-Y in the NTSC composite signal. The locus for a –20 IRE composite limit forms the negative limit graticule. –20 IRE corresponds to the negative peak values of the color reference burst in the input video signal. Violations of the positive limit are generally of more concern since this is subject to clipping to prevent carrier aural carrier modulation, i.e., "buzz" on an amplitude modulation, vestigial sideband (AMVSB) television transmitter or over deviation on frequency modulated (FM) transmitters and tape recorders.

Figure 3:
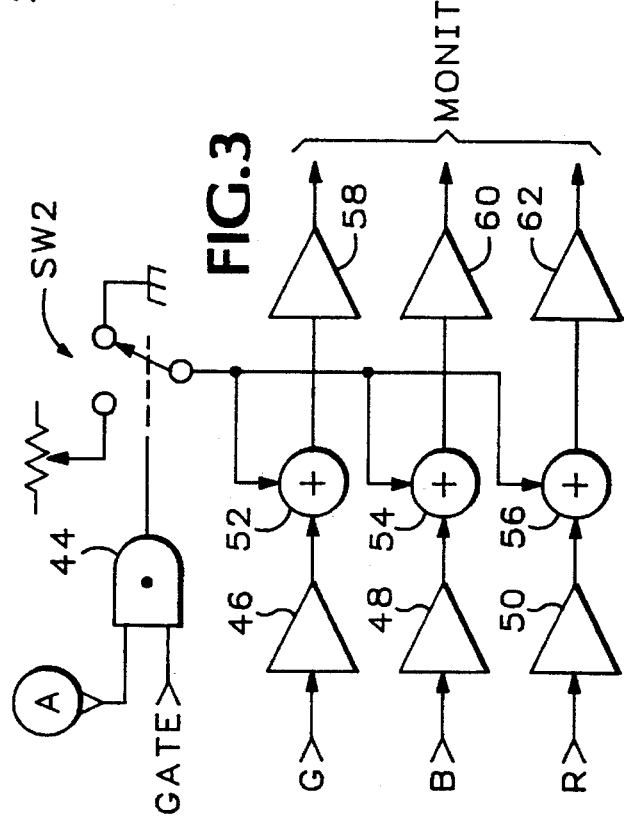
FIG. 3 is a block diagram view of a bright-up circuit for the composite signal limit violation detector according to the present invention.

The composite signal level violations may also be used to provide a gamut error bright-up display on a television monitor (not shown). As shown in FIG. 3 the positive error output (A) from the positive comparator 36 of FIG. 1 is input to an AND gate 44 together with a gate signal that oscillates at a relatively slow rate, such as 1 Hz. The output of the AND gate 44 controls a second switch SWZ that selects either zero (ground) or a bright-up value as an output. The color signals, either GBR as shown or Y,B-Y,RY, are input via respective input buffer amplifiers 46, 48, 50 to associated adders 52, 54, 56 at which the output from the second switch SW2 is combined with the signals, or with just one of the signals such as the G or Y component. The resulting outputs via respective output buffer amplifiers 58, 60, 62 are applied to the television monitor so that composite signal limit violations show up on the displayed video image as a flicker at the locations in the displayed image where the violations occur.

Finally the arrowhead display may be combined with a diamond display, as described in U.S. Pat. No. 5,307,087, filed Jan. 13, 1993 by David G. Baker entitled "Three-Dimensional RGB Component Vector Display" and incorporated herein by reference, as well as with a conventional vectorscope display. The input video signal is applied in parallel to a conventional vectorscope processing circuit 64, to a diamond display processing circuit 66 and to a Y v |C| processing circuit 68 according to the present invention. A third switch SW3 sequentially selects for input to a display device 70 one of the outputs from the three circuits 64, 66, 68 in response to a display select signal, switching in rotation between the outputs on a line by line, field by field or frame by frame basis, to present an apparent simultaneous display of the three outputs on a combination display. The outputs of the three circuits 64, 66, 68 are appropriately offset so that, for example, the arrowhead display appears at the left hand side of the combination display, the diamond display appears in the center of the combination display, and the vectorscope display appears at the right hand side of the combination display. The offsets are conveniently added in the display device 70 so that when an operator selects any one of the outputs alone, or any combination of two or more of the outputs, the amount of offset is determined by the particular configuration chosen.

Thus the present invention provides a composite signal-limit indicator for component monitors by converting an input signal to composite Y and Mag|C| component signals, and comparing these signals with the locus of 100 IRE points for positive signal limits and with the locus of –20 IRE points for negative signal limits, the Y and Mag|C| values being plotted as an arrowhead display and the comparison results being used to bright up an image monitor display or being captured to provide an indication on the component monitor.

What is claimed is:

1. A method of displaying composite signal level violations for an input video signal on a component monitor display device comprising the steps of:

converting the input video signal into composite luminance and chrominance component signals;

displaying the composite luminance and chrominance component signals as an X-Y display on the component monitor display device; and displaying a positive graticule which is the locus of a positive limit value and a negative graticule which is the locus of a negative limit value so that composite signal level violations are indicated by points on the X-Y display representing the composite luminance and chrominance component signals that fall outside the positive and negative graticules, the graticules forming an arrowhead graticule.

2. An apparatus for generating a composite signal level violation display for an input video signal on a component monitor display device comprising:

means for converting the input video signal into composite luminance and chrominance component signals;

means for displaying the composite luminance and chrominance component signals as an X-Y display on the component monitor display device; and means for displaying a positive graticule which is the locus of a positive limit value and a negative graticule which is the locus of a negative limit value so that composite signal level violations are indicated by points on the X-Y display representing the composite luminance and chrominance component signals that fall outside the positive and negative graticules, the graticules forming an arrowhead graticule.

3. An apparatus as recited in claim 2 further comprising:

means for combining the composite luminance and chrominance component signals to form first and second comparison signals;

means for comparing the first and second comparison signals with the positive and negative limit values, respectively, to generate a gamut error signal; and means for capturing the gamut error signal for subsequent processing.

4. An apparatus as recited in claim 3 further comprising means for generating a bright-up signal from the gamut error signal for display on an image monitor.

5. An apparatus as recited in claim 4 wherein the brightup signal generating means comprises:

means for combining the gamut error signal with an oscillating gate signal to provide a bright-up control signal;

means for selecting a bright-up signal value in response to the bright-up control signal; and means for combining the bright-up signal value with the input video signal to produce the bright-up signal so that locations within the image on the image monitor where composite signal level violations occur appear to flicker at a frequency determined by the frequency of the oscillating gate signal.

6. An apparatus as recited in claim 2 further comprising:

means for generating a vectorscope display signal from the input video signal;

means for generating a diamond display signal from the input video signal; and means for sequentially selecting the vectorscope, the diamond and the composite luminance and chrominance component X-Y display signals to present an apparent simultaneous display of the signals on the X-Y display.

* * * * *